United States Patent [19]

Maki et al.

[11] Patent Number: 4,680,203

[45] Date of Patent: Jul. 14, 1987

[54] PROTECTIVE COATING ON CONCRETE CONSTRUCTION

[75] Inventors: Hirohisa Maki, Neyagawa; Katsuaki Matsuo, Kyoto, all of Japan

[73] Assignee: Dai-Ichi Kogyo Seiyaku Co., Ltd., Kyoto, Japan

[21] Appl. No.: 862,877

[22] Filed: May 13, 1986

[30] Foreign Application Priority Data

| May 13, 1985 | [JP] | Japan | 60-101752 |
| May 22, 1985 | [JP] | Japan | 60-111000 |
| Jun. 3, 1985 | [JP] | Japan | 60-121050 |
| Jul. 31, 1985 | [JP] | Japan | 60-170060 |

[51] Int. Cl.$^4$ ............................................. B05D 3/02
[52] U.S. Cl. ................................. 427/393.6; 427/407.1
[58] Field of Search ....................... 427/393.6, 407.1

[56] References Cited

U.S. PATENT DOCUMENTS

| 3,546,148 | 12/1970 | Diamond et al. | 427/393.6 X |
| 3,908,043 | 9/1975 | Evans | 427/407.1 X |
| 4,025,683 | 5/1977 | Meader, Jr. et al. | 427/407.1 X |
| 4,237,177 | 12/1980 | Slama et al. | 427/407.1 X |
| 4,254,168 | 3/1981 | Monson | 427/407.1 X |

Primary Examiner—Thurman K. Page
Attorney, Agent, or Firm—Millen & White

[57] ABSTRACT

A method of forming a protective coating on concrete or mortar construction which comprises coating said construction with a polyurethane coating composition comprising (A) a polyol component having an average hydroxyl number from 30 to 450 mg KOH/g, or a mixture of a polyol component and a polyamine component having the sum of average hydroxyl number and average amine number of from 30 to 450 mg KOH/g; and (B) an organic polyisocyanate curing agent, the proportion of said component (B) in terms of the NCO equivalent thereof relative to the active hydrogen equivalent of said component (A) being from 0.6 to 1.5.

7 Claims, No Drawings

PROTECTIVE COATING ON CONCRETE CONSTRUCTION

BACKGROUND OF THE INVENTION

This invention relates to a method of forming a protective coating on concrete or mortar construction.

It is known that many concrete construction such as highways, bridges, marine construction and buildings are often deteriorated by the development of cracks, cleavage and other disruption. It is believed that such deterioration is caused by the pressure of expansion of iron rust which occurs upon passage of various corrosive agents through concrete. Since such phenomenon may be seen more frequently in areas near ocean or concrete construction which is directly contacted by sea water, it is believed that chloride ions are responsible for such phenomenon commonly called "salt damage". In addition to chloride ions, other agents such as water, carbon dioxide or oxygen are believed to have some adverse effects on the disruption of concrete construction known as alkali-aggregate reaction or neutralization.

BRIEF SUMMARY OF THE INVENTION

It is, therefore, a principal object of the present invention to provide a method of forming a protective coating on concrete or mortar construction which may eliminate or alleviate its disruption through above-mentioned phenomenon. Other objects and advantages of the present invention will become apparent as the description proceeds.

In accordance with the present invention, these and other objects may be accomplished by providing a method of forming a protective coating on concrete or mortar construction which comprises coating said construction with a polyurethane coating composition comprising (A) a polyol component having an average hydroxyl number from 30 to 450 mg KOH/g, or a mixture of a polyol component and a polyamine component having the sum of average hydroxyl number and average amine number from 30 to 450 mg KOH/g; and
(B) an organic polyisocyanate curing agent;

the proportion of said component (B) in terms of the NCO equivalent thereof relative to the active hydrogen equivalent of said component (A) being from 0.6 to 1.5.

A conventional acrylic polyurethane or fluorocarbon polyurethane top coating may be applied on the polyurethane base coating to enhance the protective effects of said coating on the concrete construction.

DETAILED DISCUSSION

The coating composition used in the present invention comprises (A) a polyol component or a mixture thereof with a polyamine component, and (B) a polyisocyanate curing agent.

COMPONENT (A)

Polyols which may be used herein may be classified as follows:

(i) Polyether Polyols:

Conventional polyether polyols produced by additionreacting a starting active hydrogen compound with an alkylene oxide such as ethylene oxide, propylene oxide or butylene oxide may be employed.

Examples of starting active hydrogen compounds include polyhydroxyl compounds such as ethylene glycol, diethylene glycol, propylene glycol, dipropylene glycol, butylene glycol, tetramethylene glycol, dibutylene glycol, hexylene glycol, glycerine, trimethylolpropane, pentaerythritol, bisphenol A, triethanolamine, N-methyldiethanolamine and tripropanolamine; and amines such as ethylenediamine, aniline, toluylenediamine, N-aminoethylpiperazine, isophoronediamine, phenylenediamine, diaminodiphenylmethane and xylylenediamine.

(ii) Polyester polyols:

Polyester polyols which may be used herein include a reaction product of a polycarboxylic acid such as adipic acid, maleic acid, dimerized linolenic acid, or phthalic acid with a polyether polyol or its starting polyhydroxyl compound as listed above.

(iii) Lactone polyesters such as polycaprolactone (iv) Polymer polyols such as those produced by polymerizing a vinyl monomer such as styrene or acrylonitrile in the above-described polyether polyol or polyester polyol.

(v) Polycarbonate diols (vi) Epoxy polyols prepared by reacting an epoxy resin with an alkanolamine.

(vii) Ricinoleic acid based polyols such as castor oil, partially dehydrated or acylated castor oil, products obtained by transesterifying castor oil with said polyether polyol (i) or other naturally occurring oils, ricinoleic acid esters of polyhydroxyl compounds, and ricinoleic acid esters of said polyester polyols (ii).

(viii) Polyols having a backbone chain solely consisting of carbon atoms, such as polyols derived from polybutadiene, polyisoprene, styrene-butadiene copolymer, styrene-isoprene copolymer, acrylonitrile-butadiene copolymer, polychloroprene and isobutylene-isoprene copolymer; hydrogenated products of these polyols; and acrylic polyols such as styrene-alkyl acrylate-hydroxyalkyl methacrylate copolymer. Specific examples of commercial available polyols of this class include Poly BD R45HT sold by Arco, PBG-2000 and PBG-3000 sold by Nippon Soda Company, Ltd., POLYTEL sold by Mitsubishi Chemical Industries Ltd., and Nikalite-H 470 sold by Nippon Carbide Industries Co., ltd.

(ix) Mixtures of polyols (i)-(viii)

The above polyol component should have an average hydroxyl number from 30 to 450 mg KOH/g, preferably from 45 to 450 mg KOH/g. If this number is too low, the permeabilities of the resulting coating to water and to chloride ions will become too large. Conversely, if this number is too high, the resulting coating will be too hard and too brittle to follow up the development of cracks.

The above polyol components may be used in admixture with a polyamine component. Examples of polyamines include diaminodiphenylmethane, methylene-bis-(o-chloroaniline) (MOCA), chloroaniline-formaldehyde condensate, phenylenediamine, toluylenediamine, ethylenediamine, piperazine, alkylated aromatic polyamines, polybutadiene-based polyamine, butadiene-acrylonitrile copolymer-based polyamine, and urethanized polyamines. Polyamines produced from urethane prepolymers having terminal free isocyanato groups by reacting with a polyamines, and polyamines produced by processing such urethane prepolymers in the manner as described in Japanes Laid Open Patent Application No. 109513/84 may also be employed.

The sum of the average hydroxyl number of said polyol component and the average amine number of said polyamine component should also range from 30 to 450 mg KOH/g, preferably from 45 to 450 mg KOH/g.

It is preferable for the polyol component (A) to comprise at least 5 equivalent % of said ricinoleic acid-containing polyol or said polyol having a backbone chain solely consisting of carbon atoms.

COMPONENT (B)

Typical examples of organic polyisocyanates are: toluylene diisocyanate, diphenylmethane diisocyanate (MDI), naphthalenediisocyanate, xylylene diisocyanate (XDI), hexamethylene diisocyanate (HDI), isophorone diisocyanate (IPDI), hydrogenated MDI, hydrogenated XDI, biuret of HDI, isocyanurate of HDI or IPDI and the like. Non-yellowing aliphatic and alycyclic polyisocyanates are preferable.

The proportion of component (B) relative to component (A) should be such that the ratio of the NCO equivalent of component (B) to the active hydrogen equivalent of component (A) ranges from 0.6 to 1.5. If this NCO/active hydrogen ratio is too low, the resulting film will exhibit poor waterproofness, poor adhesion to concrete substrate or top finish, or exassive moisture-permeability. Conversely, if the NCO/active hydrogen ration is too high, the coating composition tends to foam or results in a film having poor appearance.

COATING COMPOSITION

Component (A) and component (B) are preferably mixed together during or a short time before the composition is used. Alternatively, a urethane prepolymer having terminal isocyanato groups prepred by reacting a whole amount of component (B) with a portion of component (A) may be admixed with the remaining portion of component (A) for chain-extending during or a short time before the application of the composition.

The composition can contain conventional additives such as solvents, plasticizers, fillers, pigments, water-absorbents, anti-precipitating agents, anti-segregation agents, catalysts and the like.

The coating composition of this invention may be applied over a variety of concrete or mortar construction by any of the conventional application methods such as spraying, brushing and the like.

The concrete substrate may be given a primer coating such as polyurethane or epoxy primers to improve the adhesive of the protective coating of this invention to the concrete substrate.

Preferably, a top coat comprising conventional acrylic or fluorocarbon polyurethane coating composition is applied to further improve the protective effects of the coating of the present invention on the concrete construction.

The protective coating of the present invention thus formed exhibits extremely low permeabilities to various corrosive agents such as chloride ions, water, oxygen and carbon dioxide. Thus the coating can eliminate or alleviate disruption of various concrete construction caused by corrosion of reinforcing iron rods and bars, alkali-aggregate reaction, neutralization and the like. In addition, the coating is flexible and resilient enough to follow up the development of cracks.

The following examples illustrate the invention. All parts and percentages are on a weight basis unless otherwise specified.

PRODUCTION EXAMPLE 1

Urethanized Polyamine 200 parts of polyoxypropylene glycol having an average hydroxyl number of 56.0 mg KOH/g were reacted with 35.7 parts of toluylene diisocyanate (2,4-:2,6-isomers=80:20) at 85° C. for 60 minutes to give a urethane prepolymer having a free NCO content of 3.72 %. This prepolymer was diluted with 117.8 parts of dioxane. 353.5 parts of the resulting solution were dripped to a solution consisting of 2.6 parts of 98 % $H_2SO_4$ (0.75 equivalents to the free NCO content), 162.3 parts of sodium hydrogen sulfite (0.75 equivalents to the NCO content), 30.3 parts of water and 235.7 parts of dioxane at 50° C. over 30 minutes. The mixture was allowed to react at 68° C. for additional 30 minutes. After cooling to 30° C., the mixture was reacted with a 35 % aqueous solution of hydrogen peroxide for 120 minutes. The reaction product was then neutralized with 29.5 parts of 40 % aqueous solution of potassium hydroxide and the resulting neutral salt was filtered off. The filtrate was evaporated to remove the solvent to leave a pale yellow, viscous liquid.

The resulting urethanized polyamine had an amine number of 47.0 mg KOH/g corresponding to an amine conversion rate of 92.4 % based on the NCO content of the starting prepolymer.

EXAMPLE 1

|  | Parts |
| --- | --- |
| Component (A) | |
| Ricinoleic acid triglyceride having an average hydroxyl number of 180 mg KOH/g | 100 |
| Talc | 100 |
| Synthetic zeolite | 2.5 |
| Dibutyltin dilaurate | 0.05 |
| Pigment | 5.0 |
| Total | 207.55 |
| Component (B) | |
| Crude MDI, NCO equivalent = 136 | |

Component (A) and Component (B) were mixed together in a proportion of 4.53=1.00 on weight basis (NCO/active hydrogen=1.05), applied on a Teflon sheet to a film thickness of 300 microns using an airless spray gun, and allowed to cure for 24 hours at room temperature.

Then a two-components, acrylic polyurethane coating composition consisting of 400 parts of an acrylic polyol component and 100 parts of a polyisocyanate component as specified below, respectively was applied thereon to a film thickness of 50 microns using an airless spray gun.

|  | % |
| --- | --- |
| Acrylic Polyol Component | |
| Butyl acrylate-styrene-hydroxyethyl methacrylate copolymer | 30 |
| Stabilizer | 4 |
| Pigment | 38 |
| Solvent | 28 |
| Total | 100 |
| Polyisocyanate Component | |
| Adduct of 1 mole of trimethylolpropane and 3 moles of HDI | 42 |
| Solvent | 58 |

-continued

| | % |
|---|---|
| Total | 100 |

The resulting film was allowed to cure at room temperature for 7 days.

Crack follow-up property and permeabilities to water and chloride ions of the resulting coating were determined. The results obtained are shown in Table 1.

A separate sample having the same base and top coating layers as above was prepared by applying the above base and top coating compositions successively on a mortar plate which was pre-coated with a one component polyurethane primer (POLYFLEX M-50 sold by Dai-Ichi Kogyo Seiyaku Co., Ltd.) in an amount of 0.2 kg/m² by brushing followed by curing at room temperature for 3 hours. This sample was used for the measurement of alkali resistance and weatherability. The results obtained are also shown in Table 1.

EXAMPLE 2

The procedure of Example 1 was followed except that Component (A) and Component (B) had the following constituents.

| | Parts |
|---|---|
| Component (A) | |
| Arco Poly BD R45HT having an average hydroxyl number of 46.5 mg KOH/g | 100 |
| Aniline-propylene oxide adduct having an average hydroxyl number of 534 mg KOH/g | 3 |
| Mica | 10 |
| Xylene | 30 |
| Total | 143 |
| Component (B) | |
| AISONATE 143 L, sold by Kasei-Upjohn, free NCO content = 29.0% | 15.5 |

The NCO/active hydrogen equivalent ratio of this composition was 0.95. Properties of the resulting coating are shown in Table 1.

EXAMPLE 3

The procedure of Example 1 was followed except that Component (A) and Component (B) had the following constituents.

| | Parts |
|---|---|
| Component (A) | |
| Castor oil having an average hydroxyl number of 161 mg KOH/g | 90 |
| Urethanized polyamine of Production Example 1 having an average amine number of 47 mg KOH/g | 10 |
| Talc | 100 |
| Xylene | 30 |
| Total | 230 |
| Component (B) | |
| Crude HDI having a free NCO content of 31.0% | 36.1 |

The sum of average hydroxyl number and amine number of said Component (A) was 149.6 mg KOH/g and the NCO/active hydrogen equivalent ratio was 1.0. Properties of the resulting coating are shown in Table 1.

EXAMPLE 4

The procedure of Example 1 was followed except that the following urethane prepolymer and hardener compositions were used.

| | Parts |
|---|---|
| Urethane Prepolymer | |
| Urethane prepolymer having a free NCO content of 3.5% prepared by reacting 85.1 parts of polybutylene glycol having a hydroxyl number of 56.1 mg KOH/g and 14.9 parts of toluylene diisocyanate at 100° C. for 3 hours | 100 |
| Hardener | |
| A 50:50 mixture of polypropylene glycol and MOCA having the sum of average hydroxyl number and amine number of 238 mg KOH/g | 19.6 |
| Toluene | 16.2 |
| Lead octanoate | 2.0 |
| Carbon black | 5.0 |
| Talc | 35.0 |
| Defoaming agent | 1.0 |
| Total | 78.8 |

The sum of average hydroxyl number and amine number of the entire composition was 63.4 mg KOH/g and the NCO/active hydrogen equivalent ratio was 1.0. Properties of the resulting coating are shown in Table 1.

EXAMPLE 5

The procedure of Example 1 was followed except that Component (A) and Component (B) had the following constituents.

| | Parts |
|---|---|
| Component (A) | |
| A 50:50 mixture of Arco Poly BD R45HT and castor oil polyol YX-410 sold by Ito Seiyu Co., Ltd. having an average hydroxyl number of 166 mg KOH/g | 90 |
| Urethanized polyamine of Production Example 1 having an average amine number of 47 mg KOH/g | 10 |
| Talc | 100 |
| Xylene | 30 |
| Total | 230 |
| Component (B) | |
| Crude MDI having a free NCO content of 31.0% | 24.2 |

The sum of average hydroxyl number and amine number was 100 mg KOH/g and the NCO/active hydrogen equivalent ratio was 1.0. Properties of the resulting coating are shown in Table 1.

EXAMPLE 6

The procedure of Example 1 was followed except that the acrylic polyurethane top coating was replaced by a fluorocarbon polyurethane coating composition having the following constituents.

| | |
|---|---|
| Fluorocarbon polyol having a fluorine content of 28% and a hydroxyl number of 50 mg KOH/g | 100 parts |

-continued

| | |
|---|---|
| Titanium dioxide | 4.3 parts |
| Xylene | 200 parts |
| Methyl isobutyl ketone | 100 parts |
| Biuret of HDI | 18 parts |
| Total | 422.3 parts |

Properties of the resulting coating are shown in Table 1.

COMPARATIVE EXAMPLES 1 AND 2

The procedure of Example 1 was followed except that a commercially available acrylic coating composition (Comparative Example 1) or coal tar-epoxy coating composition (Comparative Example 2) was used as the base coating composition.

Properties of the resulting coating are shown in Table 1.

COMPARATIVE EXAMPLE 3

The procedure of Example 1 was followed except that Component (A) and Component (B) had the following constituents.

| | Parts |
|---|---|
| Component (A) | |
| Polyester polyol having an average hydroxyl number of 25 mg KOH/g prepared by reacting tetramethylene glycol and adipic acid | 100 |
| Talc | 100 |
| Synthetic zeolite | 2.5 |
| Dibutyltin dilaurate | 0.05 |
| Ethyl acetate | 50 |
| Pigment | 5.0 |
| Total | 257.55 |
| Component (B) | |
| Crude MDI, NCO equivalent = 136 | |

Component (A) and Component (B) were mixed together at a NCO/active hydrogen equivalent ratio of 1.0.

Properties of the resulting coating are shown in Table 1.

COMPARATIVE EXAMPLE 4

The procedure of Example 1 was followed except that Component (A) and Component (B) had the following constituents.

| | Parts |
|---|---|
| Component (A) | |
| Glycerine-propylene oxide adduct having an average hydroxyl number of 270 mg KOH/g | 100 |
| Talc | 100 |
| Synthetic zeolite | 2.5 |
| Dibutyltin dilaurate | 0.05 |
| Pigment | 5.0 |
| Total | 207.55 |
| Component (B) | |
| Adduct of one mole of trimethylolpropane and 3 moles of toluylenediisocyanate having free NCO content of 13.2% | |

Component (A) and Component (B) were mixed together in a proportion of 1.36:1.00 on weight basis. At the same time the mixture was diluted with 10.0 % by weight of the mixture of methyl ethyl ketone.

The average hydroxyl number of the entire composition was 457.1 mg KOH/g and the NCO/active hydrogen equivalent ratio was 1.0.

Properties of the resulting coating are shown in Table 1.

TABLE 1

| Test Item | Example | | | | | | Comparative Example | | | |
|---|---|---|---|---|---|---|---|---|---|---|
| | 1 | 2 | 3 | 4 | 5 | 6 | 1 | 2 | 3 | 4 |
| Appearance[1] | O | O | O | O | O | O | O | O | O | X |
| Crack follow-up[2] | O | O | O | O | O | O | X | X | O | X |
| Permeability to water[3] | 10 | 5 | 11 | 13 | 11 | 12 | 66 | 5.8 | 128 | 72 |
| Permeability to Cl−[4] | $2.5 \times 10^{-4}$ | $1.7 \times 10^{-3}$ | $2.8 \times 10^{-2}$ | $1.5 \times 10^{-4}$ | | $1.1 \times 10^{-4}$ | $2.8 \times 10^{-2}$ | $1.5 \times 10^{-4}$ | 1.3 | $1.2 \times 10^{-1}$ |
| Alkali resistance[5] | O | O | O | O | O | O | O | O | X | O |
| Weatherability[6] | O | O | O | O | O | O | O | X | X | X |

[1] Appearance was judged by the method according to JIS K 5400. The coating film was visually observed for uniform finish, flow, cracks and peeling.
O : Good
X: Bad
[2] Crack follow-up was determined by the following method. The test film was firmly cramped by a pair of cramping members at a distance of 2 mm. Then the cramping members were reciprocated between distance zero and distance 2 mm.
O : No breaking occurred up to 100 reciprocations.
X: Breaking occurred by less than 100 reciprocations.
[3] Permeability to water was determined by the method according to ASTM E-96 and represented in terms of g $H_2O/m^2$/day.
[4] Permeability to chloride ions was determined by the following method. A water reservoir was vertically divided by the sample film (70 × 70 mm) into two chambers. One chamber was filled with 3% saline and the other with distilled water. The chloride ion concentration in the distilled water side was determined by the potentiometric titration.
The permeation rate of chloride ions (Q) may be calculated by the following equation.

$$Q \text{ (mg/cm}^2/\text{day)} = \frac{V \times m \times 10^{-3}}{A \times 30}$$

wherein V is the quanity of distilled water (g), m is the chloride ion concentration measured (ppm), and A is the surface area of sample film submerged in water (cm²).
[5] Alkali resistance was judged by immersing sample film in a saturated aqueous solution of calcium hydroxide for 30 days. Then the presence or absence of pop-outs, cracks and peeling was visually examined.
O : No change.
X: Development of pop-outs, cracks or peeling was observed.
[6] Weatherability was tested in Sunshine Weather-O-Meter for 300 hours.
O : No change.
X: Chalking, cracks, peeling or other defects were seen.

(1) Appearance was judged by the method according to JIS K 5400. The coating film was visually observed for uniform finish, flow, cracks and peeling.
O: Good
X: Bad (2) Crack follow-up was determined by the following method. The test film was firmly cramped by a pair of cramping members at a distance of 2 mm. Then the cramping members were reciprocated between distance zero and distance 2 mm.

○: No breaking occurred up to 100 reciprocations.

×: Breaking occurred by less than 100 reciprocations.

(3) Permeability to water was determined by the method according to ASTM E-96 and represented in terms of g $H_2O/m^2/day$.

(4) Permeability to chloride ions was determined by the following method. A water reservoir was vertically divided by the sample film (70×70 mm) into two chambers. One chamber was filled with 3% saline and the other with distilled water. The chloride ion concentration in the distilled water side was determined by the potentiometric titration.

The permeation rate of chloride ions (Q) may be calculated by the following equation.

$$Q(mg/cm^2/day) = V \times m \times 10^{-3}/A \times 30$$

wherein V is the quanty of distilled water (g), m is the chloride ion concentration measured (ppm), and A is the surface area of sample film submerged in water ($cm^2$).

(5) Alkali resistance was judged by immersing sample film in a saturated aqueous solution of calcium hydroxide for 30 days. Then the presence or absence of pop-outs, cracks and peeling was visually examined.

○: No change.

×: Development of pop-outs, cracks or peeling was observed.

(6) Weatherability was tested in Sunshine Weather-O-Meter for 300 hours.

○: No change.

×: Chalking, cracks, peeling or other defects were seen.

EXAMPLE 7

| Urethane Prepolymer | Parts |
| --- | --- |
| Polypropylene glycol diricinolate having an average hydroxyl number of 56.0 mg KOH/g | 85.1 |
| Toluylene diisocyanate | 14.9 |
| Total | 100 |

The above two reactants were reacted at 100° C. for 4 hours to give a urethane prepolymer having a free NCO content of 3.50 %.

| Hardener | Parts |
| --- | --- |
| A 50:50 mixture of polypropylene glycol and MOCA having the sum of average hydroxyl number and amine number of 238 mg KOH/g | 18.4 |
| Dioctyl phthalate | 10 |
| Lead octanoate | 2 |
| Carbon black | 4 |
| Talc | 25 |
| Micronized silica | 10 |
| Defoaming agent | 1 |
| Total | 70.4 |

The urethane prepolymer component and the hardener component were mixed together in a proportion of 100:70 on weight basis, applied on a Teflon coated steel plate to a film thickness of 350 microns, and cured at room temperature for 7 days.

The sum of average hydroxyl number and average amine number of the coating composition was 88.4 mg KOH/g and the NCO/active hydrogen equivalent ratio was 1.07.

The resulting film was tested for crack follow-up property and permeabilities to water and to chloride ions.

A separate sample was prepared by applying the same coating composition on a shot blasted steel plate to a film thickness of 300 microns. This samples was tested for resistance to saline water.

The results obtained are shown in Table 2.

EXAMPLE 8

The procedure of Example 7 was followed except that the hardener used had the following constituents.

| Hardener | Parts |
| --- | --- |
| A 50:50 mixture of polypropylene glycol and methylene-bis-(2,6-diisopropylaniline) having the sum of average hydroxyl number and average amine number of 228 mg KOH/g | 20.5 |
| Dioctyl phthalate | 7.9 |
| Lead octanoate | 2 |
| Carbon black | 4 |
| Talc | 25 |
| Micronized silica | 10 |
| Defoaming agent | 1 |
| Total | 70.4 |

The sum of average hydroxyl number and average amine number of the entire composition was 89.7 mg KOH/g and the NCO/active hydrogen equivalent ratio was 1.0.

Properties of the resulting coating are shown in Table 2.

EXAMPLE 9

The procedure of Example 7 was followed except that the following Component (A) and Component (B) were used.

| | Parts |
| --- | --- |
| Component (A) | |
| Castor oil having an average hydroxyl number of 161 mg KOH/g | 90 |
| Urethanized polyamine of Production Example 1 having an amine number of 47 mg KOH/g | 10 |
| Talc | 100 |
| Xylene | 30 |
| Total | 230 |
| Component (B) | |
| Crude MDI having a free NCO content of 31.0% | 36.1 |

The sum of average hydroxyl number and average amine number of Component (A) was 149.6 mg KOH/g and the NCO/active hydrogen equivalent ratio was 1.0.

Properties of the resulting coating are shown in Table 2.

TABLE 2

| Test Item | Example 7 | Example 8 | Example 9 |
| --- | --- | --- | --- |
| Appearance | ○ | ○ | ○ |

TABLE 2-continued

| Test Item | Example 7 | Example 8 | Example 9 |
|---|---|---|---|
| Crack follow-up | ○ | ○ | ○ |
| Permeability to water | 11 | 7 | 11 |
| Permeability to Cl$^-$ | $1.8 \times 10^{-3}$ | $3.0 \times 10^{-4}$ | |
| Alkali resistance | ○ | ○ | ○ |
| Saline resistance[7] | ○ | ○ | ○ |

[7]Sample was immersed in a 3% aqueous solution of sodium chloride.
○: No change in appearance.
X: Appearance changed.

PRODUCTION EXAMPLE 2

Dehydrated Castor Oil 300 parts of castor oil (average hydroxyl number 161 mg KOH/g, viscosity 700 cps at 25° C.) was heated in the presence of 0.1 parts of phosphoric acid under vacuum at 190°-250° C. for 2 hours. After cooling to 140°-155° C., the oil was purified with acid clay. The resulting partially dehydrated castor oil had an average hydroxyl number of 140 mg KOH/g and a viscosity of 400 cps at 25° C.

PRODUCTION EXAMPLE 3

Partially Acetylated Castor Oil

A mixture of 310 parts of castor oil (average hydroxyl number 161 mg KOH/g, viscosity 700 cps at 25° C.) and 36 parts of acetic anhydride was refluxed at 120°-150° C. for 2 hours. After the reaction, the reaction mixture was distilled under vacuum at 200° C. to remove acetic acid and unreacted acetic anhydride, and then allowed to cool. The resulting partially acetylated castor oil had an average hydroxyl number of 110 mg KOH/g and a viscosity of 590 cps at 25° C.

PRODUCTION EXAMPLE 4

Polybutadiene Polyol

An autoclave was charged with 70 parts of isopropanol, 100 parts of 1,3-butadiene and 10 parts of hydrogen peroxide. The mixture was reacted at 90° C. for 5 hours. After cooling, the mixture was distilled under vacuum to remove unreacted monomer and hydrogen peroxide. The resulting product was taken out and dried to give polybutadiene polyol having an average hydroxyl number of 90 mg KOH/g.

EXAMPLE 10

The procedure of Example 7 was followed except that Component (A) and Component (B) had the following constituents.

| | Parts |
|---|---|
| Component (A) | |
| Polybutadiene polyol of Production Example 4 having a hydroxyl number of 90 mg KOH/g | 66.7 |
| Adduct of propylene oxide and aniline having an average hydroxyl number of 420 mg KOH/g | 33.3 |
| Cellosolve acetate | 10 |
| Dibutyltin dilaurate | 0.1 |
| Talc | 35 |
| Synthetic zeolite | 2.5 |
| Total | 147.6 |
| Component (B) | |
| Partially dehydrated castor oil of Production Example 2 having an average hydroxyl number of 140 mg KOH/g | 35 |
| Liquid MDI | 65 |
| Total | 100 |

Component (B) was prepared by reacting the two reactants at 100° C. for 1 hour to give a urethane prepolymer having a free NCO content of 15.2 %.

Component (A) and Component (B) were mixed together in a proportion of 100:50 on weight basis. The average hydroxyl number of the entire composition was 184.4 mg KOH/g and the NCO/active hydrogen equivalent ratio was 1.07.

Properties of the resulting coating are shown in Table 3.

EXAMPLE 11

The procedure of Example 7 was followed except that Component (A) and Component (B) had the following constituents.

| | Parts |
|---|---|
| Component (A) | |
| Partially acetylated castor oil of Production Example 3 having a hydroxyl number of 110 mg KOH/g | 25 |
| Polybutadiene polyol of Production Example 4 having a hydroxyl number of 90 mg KOH/g | 25 |
| Adduct of propylene oxide and bisphenol A having an average hydroxyl number of 300 mg KOH/g | 50 |
| Mica | 30 |
| Dibutyltin dilaurate | 0.1 |
| Synthetic zeolite | 2.5 |
| Total | 132.6 |
| Component (B) | |
| Crude MDI having a free NCO content of 31.0% | |

Component (A) and Component (B) were mixed together in a proportion of 260:100 on weight basis. The average hydroxyl number of the entire composition was 200 mg KOH/g and the NCO/active hydrogen equivalent ratio was 1.05.

Properties of the resulting coating are shown in Table 3.

EXAMPLE 12

The procedure of Example 7 was followed except that Component (A) and Component (B) had the following constituents.

| | Parts |
|---|---|
| Component (A) | |
| Transesterified castor oil with rape oil and trimethylolpropane having an average hydroxyl number of 156 mg KOH/g | 40 |
| Arco Poly BD R45HT having an average hydroxyl number of 46.5 mg KOH/g | 40 |
| Pentaerythritol monoricinolate having an average hydroxyl number of 540 mg KOH/g | 20 |
| Total | 100 |
| Component (B) | |
| Liquid MDI having a free NCO content of 28.5% | 54.6 |

The average hydroxyl number of the entire composition was 189 mg KOH/g and the NCO/active hydrogen equivalent ratio was 1.10. Properties of the resulting coating are shown in Table 3.

TABLE 3

| Test Item | Example 9 | Example 10 | Example 11 |
|---|---|---|---|
| Appearance | ○ | ○ | ○ |
| Crack follow-up | ○ | ○ | ○ |
| Permeability to water | 8 | 5 | 4 |
| Permeability to $Cl^-$ | $1.0 \times 10^{-4}$ | $2.7 \times 10^{-4}$ | |
| Permeability to $O_2$[8] | 6.7 | 2.7 | 5.2 |
| Alkali resistance | ○ | ○ | ○ |
| Saline resistance | ○ | ○ | ○ |
| Heat resistance[9] | ○ | ○ | ○ |

[8]Measurement was made using an oxygen barrier tester sold by Nissei Sangyo Co., Ltd. and represented by $g/m^2/day$.
[9]Sample was placed in an oven at 200° C. for 24 hours.
○: No change.
X: Cracks or melt.

We claim:

1. A method of forming a protective coating on concrete or mortar construction which comprises coating said construction with a polyurethane coating composition comprising;
   (A) a polyol component having an average hydroxyl number from 30 to 450 mg KOH/g, at least 5 equivalent % of which is a polyol having a backbone chain consisting solely of carbon atoms or a mixture of said polyol component and a polyamine component having the sum of average hydroxyl number and average amine number of from 30 to 450 mg KOH/g; and
   (B) an organic polyisocyanate curing agent, the portion of said component (B) in terms of the NCO equivalent thereof relative to the active hydrogen equivalent of said component (A) being from 0.6 to 1.5.

2. The method according to claim 1, wherein said backbone chain is polybutadiene.

3. The method according to claim 1 further comprising the step of applying over said polyurethane coating an acrylic polyurethane or a fluorocarbon polyurethane top coating.

4. The method according to claim 3, wherein said backbone chain is polybutadiene.

5. The method according to claim 1, wherein the polyol component has an average hydroxyl number from 45 to 450 mg KOH/g.

6. The method according to claim 1, wherein component (A) and component (B) are mixed together while or shortly before the composition is applied to the concrete or mortar construction.

7. The method according to claim 1, wherein (A) is a mixture of the polyol component and the polyamine component.

* * * * *